Aug. 9, 1932.    J. J. WILLINGER    1,870,273
FISHING BAIT
Filed Aug. 29, 1929
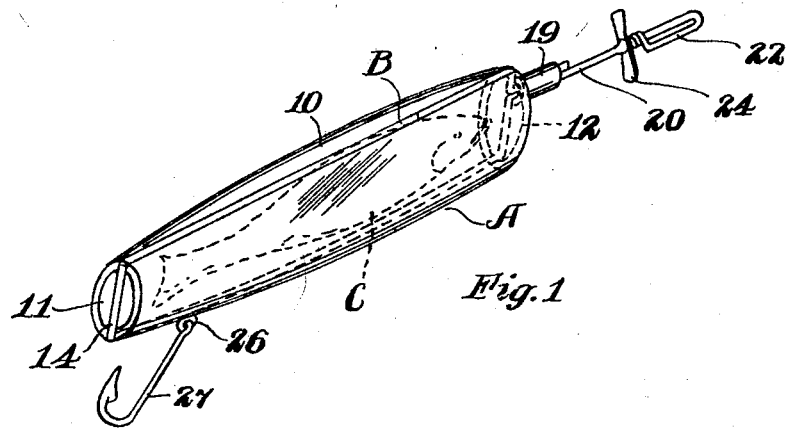
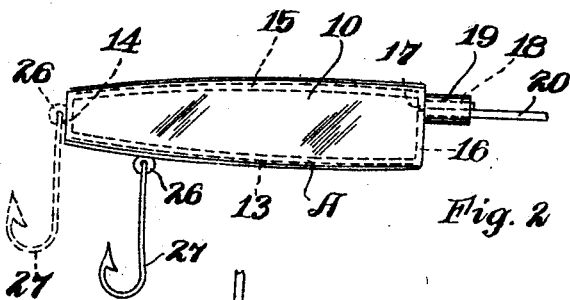
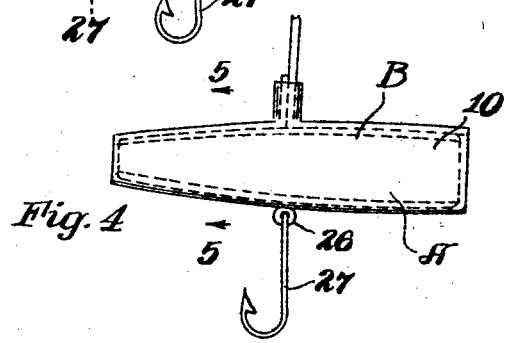
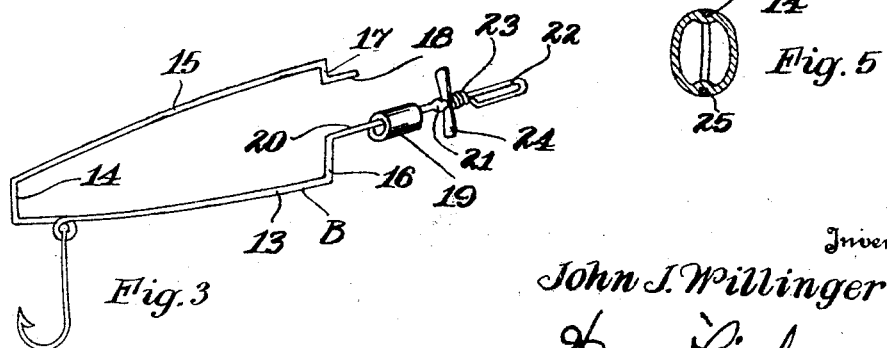
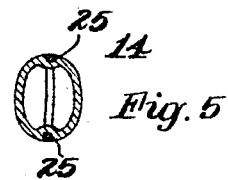
Inventor
John J. Willinger
By Howard Richey
Attorney Patented Aug. 9, 1932

1,870,273

UNITED STATES PATENT OFFICE

JOHN J. WILLINGER, OF ST. PAUL, MINNESOTA

FISHING BAIT

Application filed August 29, 1929. Serial No. 389,187.

My invention relates to a fish bait a feature of which is to provide a transparent means associated with clamping means for holding live bait without injury to the bait and so that the bait may be displayed in the water in such a manner as to be so natural that it will attract a fish and cause the fish to be engaged by hook means carried by the bait as the fish strikes the bait.

A feature of the invention resides in a bait of a simple nature which can be made economically and wherein a clamp member is provided which may be opened so as to insert the bait and also permit the changing of the transparent receptacle which is employed for supporting the bait. The clamping means may be made of wire or other suitable means formed to support the receptacle for holding the bait.

The receptacle for the live bait preferably consists of a transparent glass tubular member which supports the bait, such as a live minnow, not only clearly visible in the water but in such a manner as to permit the bait to freely move within the receptacle. The transparent receptacle may be made of any suitable material and it is designed to disappear so as to speak, when immersed in the water. Thus my bait provides a very desirable fishing means and any suitable live bait may be employed therewith. If the receptacle is broken a new one can easily be inserted in its place.

My bait may be used for trolling or other fishing, such as still fishing and in other ways of attracting a fish to the bait.

These features together with other details and objects will be more fully and clearly set forth in the specification and claims.

In the drawing forming part of this specification:

Figure 1 is a perspective view of my bait, showing the same as it would appear in use.

Figure 2 is a side view of the same, showing in dotted relation the different positions that the hook may assume or be attached.

Figure 3 is a perspective of the clamping means for the receptacle.

Figure 4 illustrates an alternative form of my bait.

Figure 5 is a section on the line 5—5 of Figure 4.

My bait A is constructed in a very simple manner, the purpose being to provide a bait for fishing which will readily attract a fish to the same and when the fish strikes the bait he will be caught by a hook means carried by the bait. The bait A is provided with a transparent receptacle 10 which may be made of glass or other suitable material and which is of a tubular nature, open at the ends 11 and 12 so that water may pass through the receptacle 10 as it is drawn through the water.

The receptacle 10 is supported by the clamp B which consists of a lower longitudinally extending portion 13, an end portion 14, and a top portion 15. The clamp B may be made of suitable spring wire or other means and is formed with an end portion 16 which extends virtually at right angles from one end of the portion 13 and which is adapted to cooperate with the end portion 17 which extends virtually at right angles from one end of the portion 15. Projecting at right angles from the portion 17 I provide a tongue portion 18 which is adapted to be engaged by the slidable ferrule 19 which is carried by the portion 20 which extends at right angles to the end portion 16. The portion 20 extends out and is formed with a shoulder 21 and the end of the portion 20 is bent to form a line loop 22 while the extreme end of the portion 20 is wound around the shank portion 20 at 23. Thus the portion 23 which is wound around the shank of the portion 20 which projects from the loop 22 together with the shoulder 21 form shoulder means between which a spinner 24 is adapted to rotate on the shank of the portion 20 adjacent the loop 22. The clamp B is formed virtually of one single piece of wire with the exception of the ferrule 19 and the spinner 24. This provides a very simple, inexpensive structure to make a desirable clamping means for my bait A which is adapted to support the transparent receptacle 10.

The receptacle 10 is formed with suitable recesses 25 extending longitudinally in the top and bottom of the same into which the portions 13 and 15 extend when the clamp B is engaged about the receptacle 10 and the end portions 14 together with the portions 16 and 17 form ends for guarding the ends of the receptacle 10. These guards such as 14, 16 and 17 are adapted to extend a bar or guard means across the open ends 11 and 12 of the receptacle 10 sufficient to hold the bait, such as a minnow C illustrated in Figure 1, within the receptacle 10. This construction permits the water to pass in and through the receptacle 10 but forms a sufficient guard means over the ends to prevent the bait, such as the minnow, from getting out of the receptacle 10.

The clamp B may be formed with an eye 26 for carrying the hook means 27 and it is obvious that one or more of these eyes 26 may be formed in the clamp B so as to carry one or more hooks, such as 27, and that the hooks may be arranged in any suitable manner in relation to the receptacle 10, as illustrated in Figures 2 and 4. The bait A in Figures 1 and 2 may be used for active fishing, while the bait A in Figure 4 where the hook 27 is secured to the bottom of the clamp B may be used in still fishing.

It is apparent that the clamp B may be disengaged from the receptacle 10 quickly and easily so that if the receptacle 10 is made of glass and it should break it may be easily replaced by a new glass receptacle and obviously the receptacle may be made of any transparent material, the object and purpose of which is to display the live bait, such as C, within the same in such a natural manner that fish will be attracted to the bait and will be caught upon the hook means 27. The simple structure of my bait is a feature of the invention and by means of the spinner 24 or other suitable decorative means upon the bait, the line attachment may be disguised to the fish and the water stirred in front of the live bait such as C, to cause the fish to start after the live bait and thus be caught.

In accordance with the patent statutes I have described the principles of operation of my bait and while I have set forth a particular structure and design together with an arangement of the parts which I believe represent the best embodiment of my invention, I desire to have it understood that these are only suggestive of a means of carrying out my invention and that other means may be employed within the scope of the following claims without departing from the purpose and intent of the invention.

I claim:

1. A fish bait including, a transparent tubular receptacle open at both ends, a clamp for supporting said receptacle extending closely over the open ends of said receptacle in a manner to form guard means over the ends of said receptacle whereby live bait may be contained therein for fishing.

2. A fishing device including, a transparent receptacle, openings in either end of said receptacle to permit the water to pass through the same, removable supporting and guard means for said receptacle passing over said openings to prevent the escape of the bait therethrough, and hook means connected to said guard and receptacle in a manner to catch a fish when said fish strikes the bait of said receptacle.

3. A device for still fishing including, a tubular receptacle of a transparent nature having open ends, a support for said receptacle formed of a single wire having means for forming guards over the open ends of said receptacle to confine live bait within the receptacle, fishing hook means connected to said guard and receptacle, and means for detachably supporting said receptacle by the support and guard means.

4. A fishing device including, a wire clamp member formed from a single piece of material, said clamp member being bent to provide a loop with a free end, a ferrule catch slidable on said clamp member for engaging said free end to close said loop, and a tubular transparent bait receptacle to be supported by said loop.

5. A fishing device including, a separable transparent receptacle and one piece wire supporting loop, said receptacle having oppositely disposed openings to admit water into the same, and guards formed in said loop to close the openings in said receptacle to confine live bait therein.

6. A fishing device including, a hollow member, oppositely disposed openings in said member to permit water to pass through the same, a supporting means for said hollow member having sleeve means slidable on said supporting means for detachably supporting said hollow member, and fish hook means connected to said supporting means and said hollow member.

JOHN J. WILLINGER.